9900X

N. Winslow.

Grate.

Patented Jul. 2, 1836.

THE NORRIS PETERS CO. PHOTO-LITHO. WASHINGTON, D. C.

7/2/1836 9900X

ASh (2402)

Nathan Winslow
Letters Patent (Patented July 2. 1836)

The Schedule referred to in these Letters Patent, and making part of the same, containing a description in the words of the said Nathan Winslow himself, of his Improvement in the Pendulum Grate for furnaces and Stoves I Nathan Winslow of Portland in the State of Maine, Merchant, a citizen of the United States of America, do hereby declare that I have invented a new and useful improvement in grates for furnaces and Stoves, called Pendulum Grates and that the following is a full and true description and specification of my invention, to wit. The grate, which may be made of wrought or cast iron, like common grates, is applied to the bottom of the furnace, and is supported by two gudgeons, one on each side, of sufficient strength and size to support the grate and the coal to be used in it. The grate is made of such a size and shape that it can revolve inside the furnace upon the gudgeons. An iron shaft is fastened to the bottom of the grate, of such length as may be convenient for turning the grate, or the shaft may be cast in one piece with the grate. To the shaft is attached a horizontal handle coming out into the open air, of such length as may be convenient for moving the grate. By taking hold of the handle and moving it backwards and forwards, it will shake the ashes out of the grate without letting down the body of coal above. By pulling out the handle to a greater extent all the coal can be let out when it is necessary to renew the fire.

Figure 4:
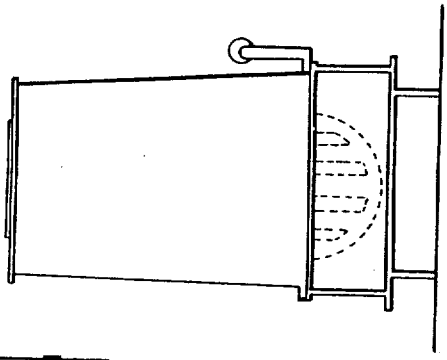
Figure 3:
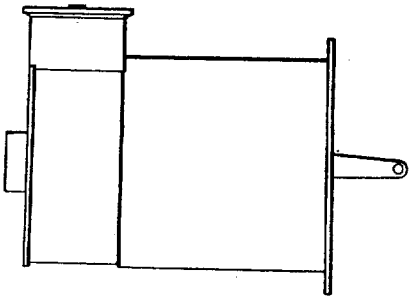
Figure 2:
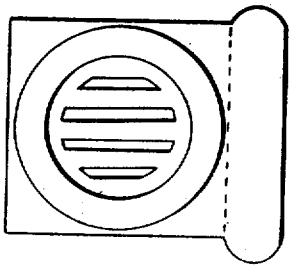
Figure 1:
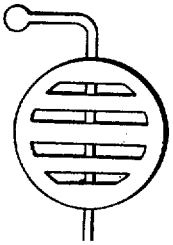

Figure 1 in the drawing hereunto annexed represents the grate with the gudgeons and handle. Figure 2 represents the bottom of the furnace with the grate set in it. Figure 3 is a cylinder which is placed over the grate and holds the coal. Figure 4 represents the whole furnace.

7/2/1836 9900X

I do not claim as my invention the furnace or grate, but I claim as
my invention the improvement in the grate by which it is suspended
on gudgeons and made to move by a handle as before described.
In testimony that the foregoing is a true description and spe-
cification of my said invention I have hereunto set my hand
this twenty eighth day of August in the year of our Lord eighteen
hundred and thirty five.

Witnesses                Nathan Winslow
G. E. Sewall }
Samuel Fessenden }   Drawing        (432 wds). E.4.G.
1196.